United States Patent [19]

Harsch et al.

[11] Patent Number: 5,142,949
[45] Date of Patent: Sep. 1, 1992

[54] HAND HELD PNEUMATIC WIRE STRIPPER

[75] Inventors: Franklin D. Harsch, Renton; Gary W. Gwin, Langley, both of Wash.

[73] Assignee: The Boeing Company, Seattle, Wash.

[21] Appl. No.: 732,638

[22] Filed: Jul. 19, 1991

[51] Int. Cl.⁵ .............................................. H02G 1/12
[52] U.S. Cl. ..................................................... 81/9.42
[58] Field of Search ...................... 81/9.41, 9.42, 9.43, 81/9.4

[56] References Cited

U.S. PATENT DOCUMENTS

| | | | |
|---|---|---|---|
| 3,176,550 | 4/1965 | Marcotte | 81/9.51 |
| 3,229,957 | 12/1965 | Kramer et al. | 81/9.51 |
| 3,416,227 | 12/1968 | McDonald | 81/9.42 |
| 3,727,492 | 4/1973 | Zanni | 81/9.5 A |
| 3,765,277 | 10/1973 | Sorensen | 81/9.5 A |
| 4,072,069 | 2/1978 | Bieganski | 81/9.5 A |

FOREIGN PATENT DOCUMENTS 1515503  7/1969  Fed. Rep. of Germany .
551246   6/1958  Italy .

Primary Examiner—Roscoe V. Parker
Attorney, Agent, or Firm—Joan H. Pauly

[57] ABSTRACT

A piston rod (32) retracts to close gripper jaws (50, 52) and cutting jaws (54, 56) and then to pivot the two pairs of jaws away from each other. The upper jaw (50, 54) of each pair is connected to a corresponding actuating lever (78). The levers (78) are pivotally mounted on a housing and are connected to an end connector (42) on the rod (32) by a flexible chain (94) which engages sprocket wheels (92) carried by the levers (78). Retraction of the rod (32) exerts a pulling force on the levers (78) to pivot the levers (78) toward each other. The pulling force has a component parallel to the actuating axis and a perpendicular component to maintain mechanical advantage.

15 Claims, 4 Drawing Sheets

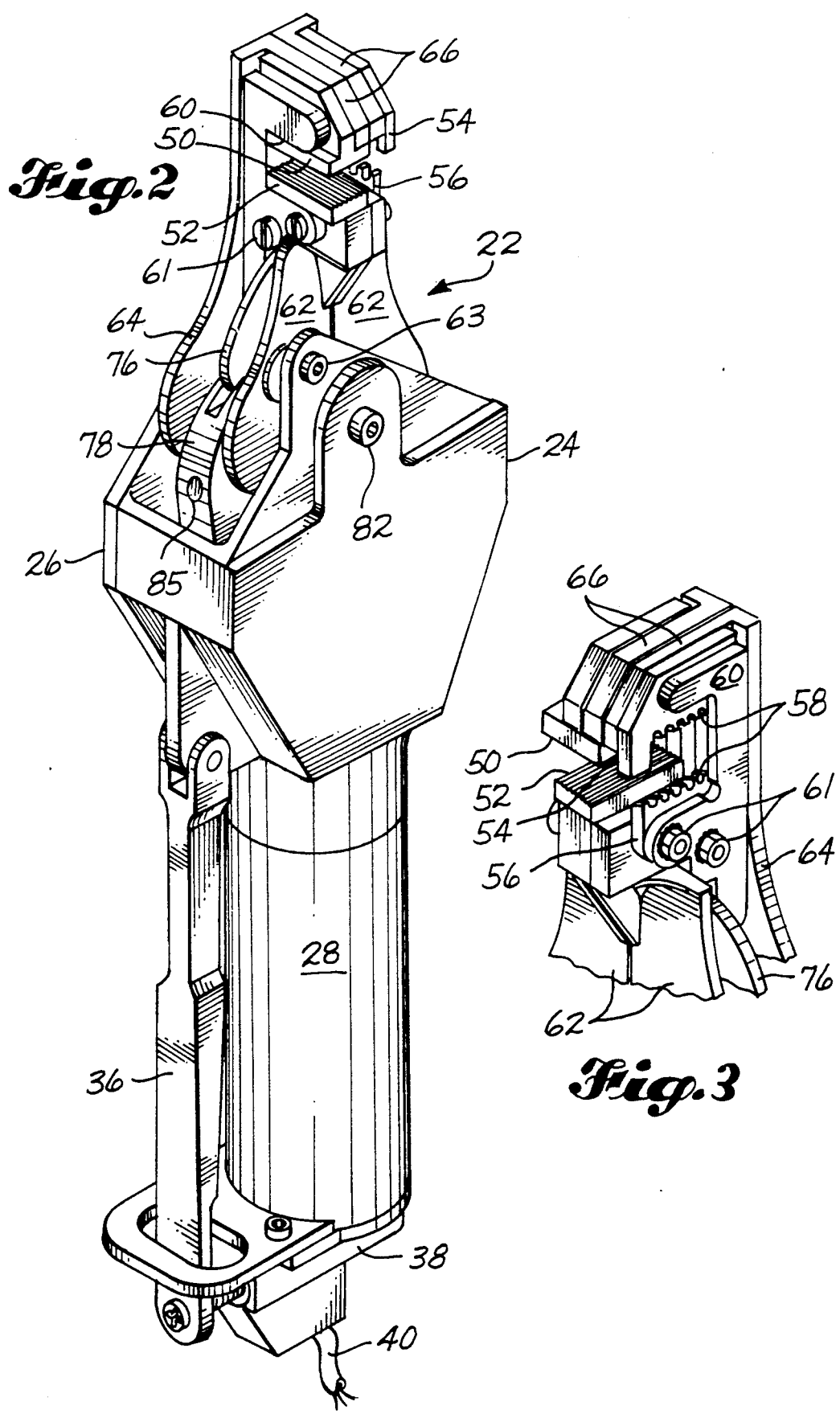

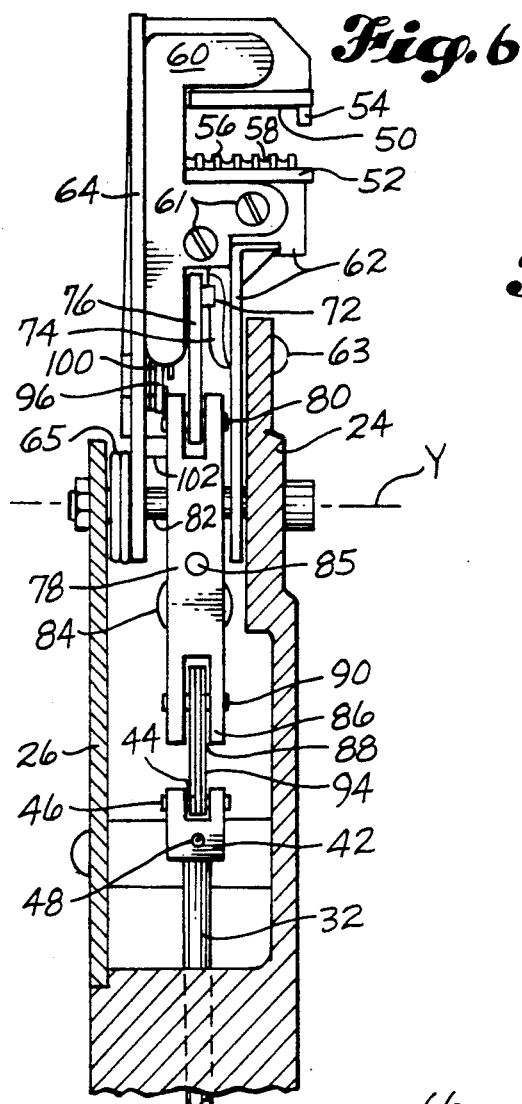
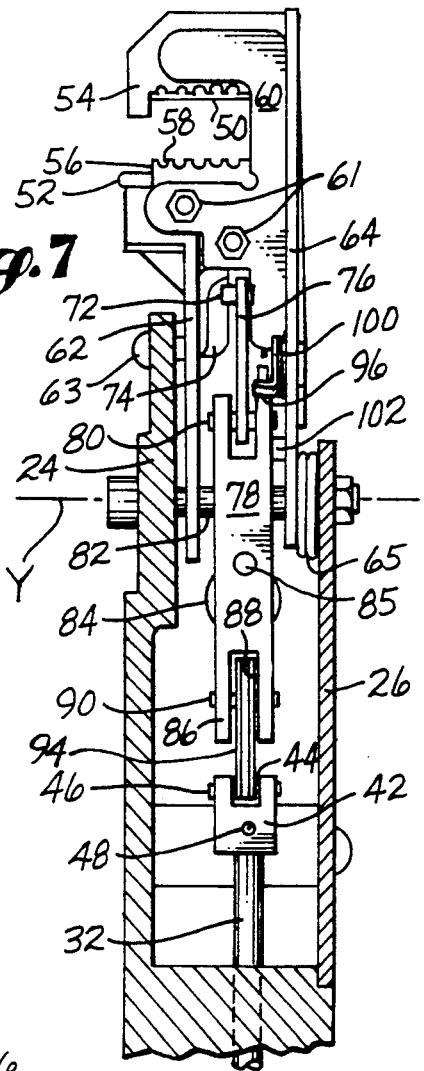
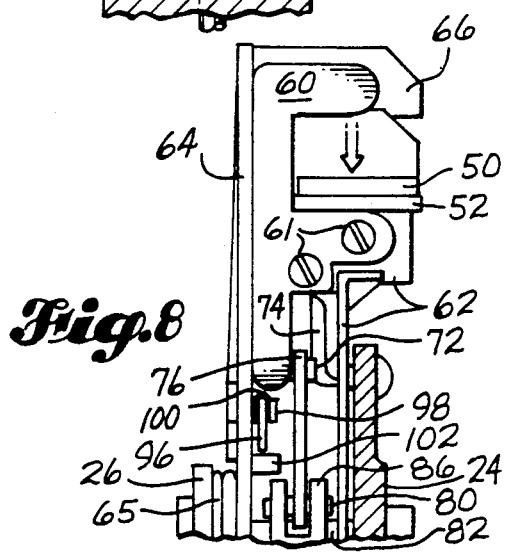
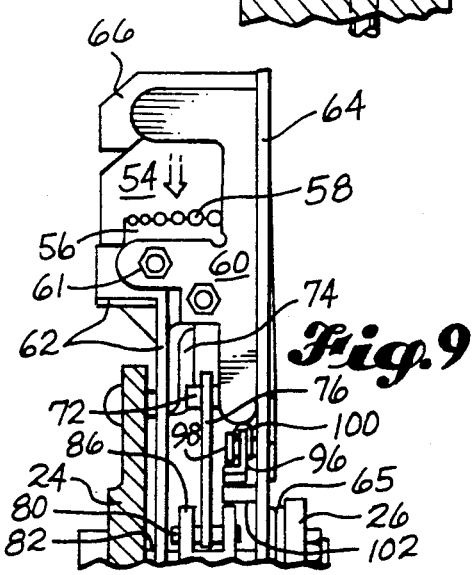

5,142,949

HAND HELD PNEUMATIC WIRE STRIPPER

DESCRIPTION

1. Technical Field

This invention relates to wire strippers and, more particularly, to such a stripper in which a flexible connector extends continuously from a linear actuator to one of a pair of levers, to the other lever, and then back to the actuator to exert a pulling force on the levers and convert linear movement of the actuator into pivotal movement of the levers, said pulling force having a component perpendicular to the actuating axis to maintain a mechanical advantage throughout the stroke of the actuator.

2. Background Information

In the aircraft and other industries, wire harnesses including wire segments having various gauges and various types of insulation are used extensively. Some of the types of wire have hard insulation made from materials such as Kapton. Stripping hard insulation requires a great deal of leverage. In manufacturing procedures for producing wire harnesses, a majority of the wire segments with hard insulation can be stripped by large bench mounted strippers in areas such as connector assembly areas. However, some of the stripping must be accomplished in other areas where large bench mounted strippers are not available. Examples of these other areas include form board areas where the wire segments are assembled together in the layup of the harness, and areas where the wire harnesses are installed. Since large bench mounted strippers are not available in such areas, hand operated wire strippers are commonly used for stripping all types of insulation, including hard insulation. Known types of hand operated wire strippers have a number of drawbacks associated with them in connection with this type of stripping A major drawback is that known strippers generally do not provide enough force for stripping hard insulation and, therefore, are either unusable for this task or require the operator to exert an extreme effort in the stripping process. Known powered hand held strippers do not provide an adequate solution to this problem since they tend to have excessively complicated structures, which add to the cost of securing and maintaining the strippers and decrease their reliability.

DISCLOSURE OF THE INVENTION

A subject of the invention is an improved wire stripper of a type having a pair of jaws movable toward and away from each other, and a pair of levers connected to at least one of the jaws and having end portions pivotable toward each other about a pivot axis to move the jaws together. According to an aspect of the invention, the improvement comprises an actuator including an actuating member and being powered to translate the member along an actuating axis perpendicular to the pivot axis. An engagement surface is carried by each of the end portions of the levers. A flexible connector engages an end portion of the actuating member adjacent to the end portions of the levers. The connector extends continuously from the actuating member, to one of the levers, to the other of the levers, and then back to the actuating member. The connector engages the engagement surfaces to exert a pulling force thereon and convert linear movement of the actuating member along the actuating axis into pivotal movement of the end portions of the levers about the pivot axis. The pulling force has a first component parallel to the actuating axis and a second component perpendicular to the actuating axis and the pivot axis.

The actuator preferably comprises a pneumatic piston and cylinder. The actuating member may be either the piston or the cylinder. Preferably, the actuating member comprises the piston.

The engagement surfaces and flexible connector may take various forms. Preferably, the engagement surfaces are formed by passageways extending through the end portions of the levers. In the preferred embodiment, a sprocket wheel is carried by each of the end portions of the levers. The connector comprises a chain that engages the sprocket wheels and has opposite ends secured to the end portion of the actuating member.

The improvement of the invention may be provided in various types of wire strippers. Currently, the improvement is preferably provided in combination with a stripper which comprises two pairs of jaws and in which the pivotal movement of the lever end portions first closes both pairs of jaws and the moves the pairs of jaws away from each other. In the most preferred combination, the stripper has laterally adjacent pairs of jaws, and the levers are connected to one jaw of each pair, respectively.

In the types of wire strippers described above in which linear movement of an actuating member is converted into pivotal movement of levers, the lever ends move both toward the actuator and toward each other. The improvement of the invention causes pulling forces to be exerted on the levers in a direction perpendicular to the linear movement of the actuator as well as in the direction of movement of the actuator, to apply the actuator force efficiently and bring the levers together. The perpendicular pulling force on the levers is important to maintaining the mechanical advantage of the actuator in moving the levers, especially toward the end of the actuator stroke. Rigid linkage, as opposed to the continuous flexible linkage of the invention, cannot maintain the mechanical advantage and, thus, requires the exertion of extreme force near the end of the stroke. The improvement of the invention solves this problem of the need for excessive force by maintaining the mechanical advantage throughout the stroke.

The invention also has a number of additional advantages. It is very versatile and may be integrated into a wide variety of types of strippers. In addition, it permits the simplicity of structure of the stripper to be maximized and greatly contributes to the reliability and cost effectiveness of the stripper.

BRIEF DESCRIPTION OF THE DRAWINGS

In the drawings, like element designations refer to like elements throughout, and:

FIG. 2 is a pictorial view of the preferred embodiment of the invention in its rest position prior to the commencement of a stripping operation.

FIG. 3 is a pictorial view of the upper portion of the stripper shown in FIG. 2 looking at the opposite side.

FIGS. 6 and 7 are side elevational views, looking at opposite sides of the stripper shown in FIGS. 2-4, with lower portions cut away and parts shown in section.

FIGS. 8 and 9 are side elevational views of the upper portions of FIGS. 6 and 7 with both pairs of jaws in a closed position.

BEST MODE FOR CARRYING OUT THE INVENTION

Figure 1:
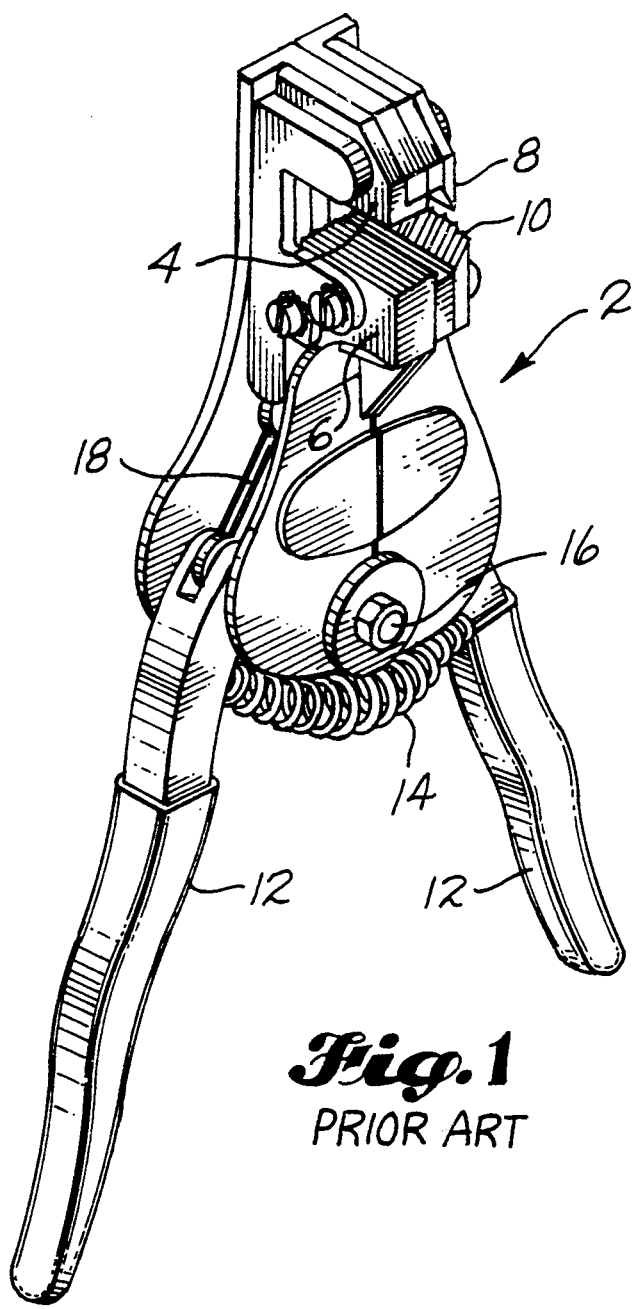
FIG. 1 is a pictorial view of a prior art hand operated wire stripper.

The drawings show a stripper 22 that is constructed according to the invention and that constitutes the best mode of the invention currently known to the applicants As shown in the drawings, the improvement of the invention is incorporated into a modified form of the type of known stripper 2 shown in FIG. 1. This is the preferred form of the invention. However, it is intended to be understood that the improvement of the invention may also be incorporated advantageously in other types of strippers, including strippers with a single pair of jaws or axially aligned pairs of jaws and strippers in which the actual stripping is accomplished by an operator pulling on a wire segment whose insulation has been cut by the stripper Referring to FIG. 1, the known type of stripper shown therein is manufactured by Ideal Ind. Inc. of Sycamore, Ill., under the trademark "STRIPMASTER". The stripper 2 includes a pair of gripper jaws 4, 6 and a pair of cutting jaws 8, 10. Actuating levers 12 are squeezed together by an operator to operate the stripper 2. One of the levers 12 is connected to the upper gripper jaw 4, and the other lever 12 is connected to the upper cutting jaw 8, so that squeezing together of the levers 12 causes the upper jaws 4, 8 to move downwardly and close against their corresponding lower jaws 6, 10. The connection between each lever 12 and its corresponding jaw 4, 8 is made via a linking lever 18 which is pivotally connected to the lever 12 and pivotally engages a tab carried by a lower extension (not shown) of the jaw 4, 8. The levers 12 are mounted on the stripper housing to pivot about a pivot connection 16. A spring 14 biases the levers 12 into the separated position shown in FIG. 1.

Referring to FIGS. 2 and 3, the preferred embodiment of the stripper 22 of the invention has the same type of jaw and linking lever construction as the stripper 2 shown in FIG. 1. The outting jaws 54, 56 of the stripper 22 are of higher quality than the jaws 8, 10 shown in FIG. 1 in order to meet aircraft industry standards. The linking levers 18 have been replaced with the higher quality linking lever 76 shown in FIG. 2. In addition, the hand engageable handle levers 12 of the stripper 2 have been replaced with actuator engageable levers 78, described further below.

The improved stripper of the invention includes a linear actuator having an actuating member. The actuator is powered to translate the member along a main or actuating axis perpendicular to the pivot axis of the actuating levers. The actuator preferably comprises a pneumatic cylinder 28 in which a piston 30 reciprocates. As shown, the stripper 22 has a housing 24 with a removable cover 26. The lower portion of the housing 24 forms the pneumatic cylinder 28. A piston rod 32 extends from and reciprocates with the piston 30 and is linked to the upper gripper jaw 50 and the upper cutting jaw 54 as described further below. A spring 34 is positioned in the cylinder 28 to bias the piston 30 into the rest position illustrated in FIG. 4. The stripper 22 is operated by a trigger lever 36 which admits pressurized air into the cylinder 28 through a valve 38. The valve 38 may take any of various known forms. A flexible hose 40 connects the valve 38 to a source of pressurized air.

In accordance with the invention, the stripper has at least one pair of jaws movable toward and away from each other between open and closed positions, either by movement of one of the jaws or movement of both jaws. The preferred jaw structure of the stripper 22 can be seen in FIGS. 2-9, with its overall structure being best seen in FIGS. 2 and 3. The stripper 22 has a pair of upper and lower gripper jaws 50, 52, and a pair of upper and lower cutting jaws 54, 56 positioned laterally adjacent to the gripper jaws 50, 52. The cutting jaws 54, 56 have semi-circular slots 58 formed therein. The slots 58 on the upper and lower jaws 54, 56 are aligned to form circular openings when the jaws 54, 56 are closed, as shown in FIG. 9. The openings provide clearance for the conductors of wires when the jaws 54, 56 have closed to partially cut through the insulation on the wires.

The lower jaws 52, 56 are mounted in a fixed position relative to the housing 24 by front and back mounting plates 62, 64. The plates 62, 64 are attached to the housing 24 by a mounting pin 82, which threadedly engages at least the rear plate 64. The pin 82 also serves as a pivot pin for actuating levers 78, described below. An additional fastener 63 secures the front plate 62 to the housing 24. An outer side guide plate 60 is positioned laterally adjacent to the outer lateral surface of each pair of jaws 50, 52 and 54, 56. Fasteners 61 secure the guide plates 60 to the lower jaws 52, 56 and both the side plates 60 and the lower jaws 52, 56 to the front mounting plate 62. Each of the front and back mounting plates 62, 64 is formed in two pieces to permit the two pieces to pivot relative to each other about the mounting pin 82 to allow the pairs of jaws 50, 52 and 54, 56 to pivot away from each other. Each of the pieces of the rear plate 64 has an upper guide portion 66 extending forwardly therefrom. The upper jaws 50, 54 are mounted to slide axially along the main or actuating axis X shown in FIG. 4. The sliding movement of each jaw 50, 54 is guided by the upper portion of the side guide plate 60 and the upper guide 66 on the rear plate 64 between which it is mounted.

Each of the axially slidable upper jaws 50, 54 has an extension 68, 70 extending downwardly therefrom along the axis X. A forwardly projecting tab 72 is carried by the lower end of each extension 68, 70. Sliding axial movement of the tab 72 is guided by a guide surface 74 formed on the corresponding half of the front mounting plate 62. The tabs 72 provide a means for linking the jaws 50, 54 to the pneumatic actuator 28, 30.

Figure 4:
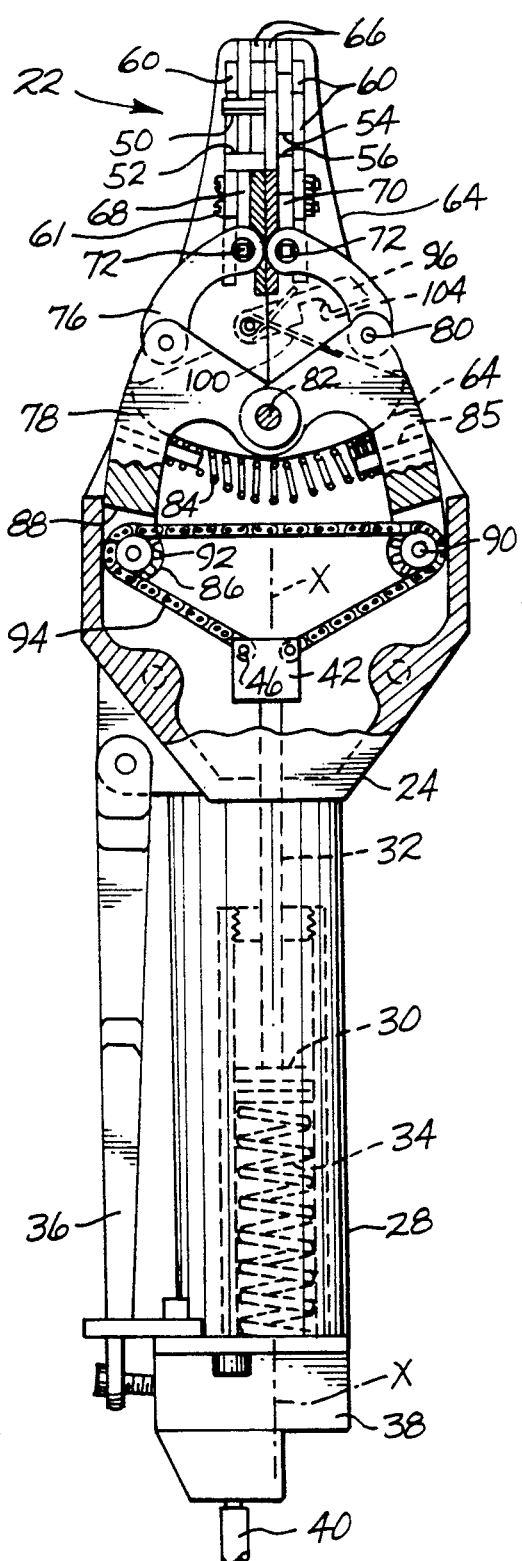
FIG. 4 is a front elevational view of the stripper shown in FIGS. 2 and 3, with parts shown in section.
Figure 5:
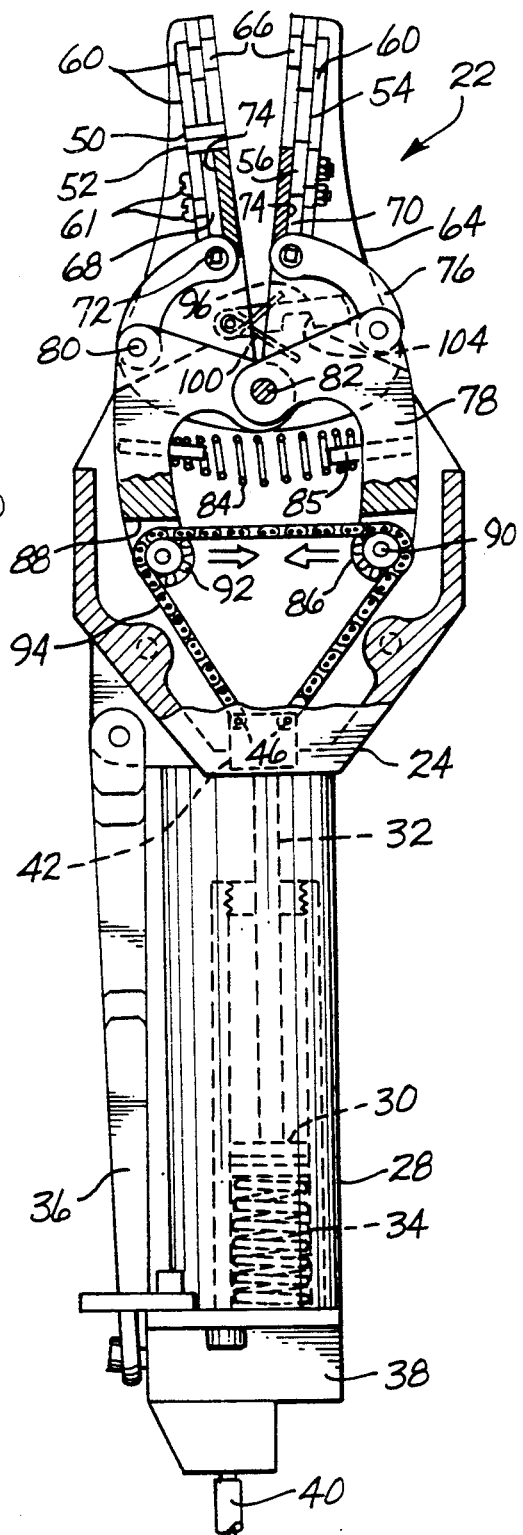
FIG. 5 is like FIG. 4 except that it shows both pairs of jaws closed and the pairs pivoted away from each other.

The stripper 22 has a pair of actuating levers 78 which are pivotally mounted on the pin 82. Each lever 78 has a generally axial portion that is curved, as best seen in FIGS. 4 and 5, to fit into the compact housing 24. A radial extension on the upper portion of the lever 78 engages the pin 82. The levers 78 function in a manner similar to the hand operated levers 12 of the stripper 2 shown in FIG. 2. Pivotal movement of the levers 78 about the pin 82 to bring the lower ends of the levers 78 together first moves the upper gripper jaw 50 and the upper outting jaw 54 from the open position shown in FIGS. 2-4, 6, and 7 to the closed position shown in FIGS. 5, 8, and 9. Then, the pivoting of the levers 78 causes the two pairs of jaws 50, 52 and 54, 56 to separate, as shown in FIG. 5.

Each of the levers 78 is linked to a different one of the slidable jaws 50 54. The lever 78 is connected to its corresponding jaw 50, 54 by means of a linking lever 76 that has an upper end with an opening through which the tab 72 on the lower extension 68, 70 of the corresponding jaw 50, 54 projects, and a lower end that is pivotally connected to the actuating lever 78 by a pivot connection 80. The connection 80 allows the linking lever 76 to pivot freely relative to the actuating lever 78.

In accordance with the invention, the lower ends of the actuating levers 78 are connected to the piston 30 of the actuator 28, 30 via the piston rod 32 in order to convert linear movement of the piston 30 along the axis X into pivotal movement of the levers 78 about the axis Y defined by the pivot pin 82 (FIGS. 6 and 7). The outer or upper end of the piston rod 32 carries an end portion or end connector 42 to provide a means of attachment for a flexible connector 94. The end connector 42 may be formed separately and secured to the rod 32 by a pin 48, as shown in FIGS. 6 and 7. The flexible connector 94 extends continuously from the end connector 42 to the lower end of one of the levers 78, to the lower end of the other lever 78, and then back to the end connector 42. The connector 94 engages an engagement surface carried by each of the lower end portions of the levers 78 adjacent to the end connector 42. Preferably, the engagement surfaces are formed by passageways extending through the lower ends of the levers 78. In the preferred embodiment shown in the drawings, the lower end of each lever 78 is bifurcated and has two yoke arms 86 separated by a slot 88. A pivot pin 90 is secured to each of the arms 86 and extends through the slot 88 between the arms 86. A sprocket wheel 92 is pivotally mounted on the pin 90. The slot 88 and the sprocket wheel 92 together form the passageway through the lever end portion. The sprocket wheel 92 also forms the engagement surface. A flexible chain 94 has opposite ends each of which is secured to the end connector 42 by a pin 46. The end connector 42 has a slot 44 extending laterally therethrough (FIGS. 6 and 7) for receiving the ends of the chain 94. The chain 94 extends from the connector 42 around each of the sprocket wheels 92 and engages the teeth of the wheels 92. The wheels 92 guide movement of the chain 94 as the piston rod 32 retracts. The engagement surfaces formed by the wheels 92 also react the pulling force of the piston rod 32.

The operation of the stripper 22 is illustrated in FIGS. 4–9. FIGS. 4, 6, and 7 show the rest position of the stripper 22 before the stroke of the piston 30 commences. When pressurized air is admitted into the cylinder 28 to retract the piston 30 and piston rod 32, the piston 30 moves downwardly away from the pairs of jaws 50, 52 and 54, 56 into the retracted position shown in FIG. 5. The retracting of the piston 30 exerts a pulling force on the actuating levers 78 via the flexible chain 94. This pulling force has a first component parallel to the actuating axis X and a second component perpendicular to the axis X and also to the pivot axis Y of the levers 78. The latter component is illustrated by the arrows in FIG. 5. The pulling force on the levers 78 converts linear movement of the piston rod 32 along the axis X into pivotal movement of the end portions of the levers 78 about the pivot axis Y toward each other. Since the pulling force on the levers 78 has a perpendicular, as well as an axial component, the mechanical advantage of the flexible connector 94 is maintained throughout the stroke of the piston 30.

During the initial portion of the piston stroke, the two pairs of jaws 50, 52 and 54, 56 remain in their adjacent position shown in FIG. 4, and the upper jaw 50, 54 of each pair moves downwardly toward its corresponding lower jaw 52, 56. This movement continues until both pairs of jaws 50, 52 and 54, 56 reach their fully closed positions shown in FIGS. 8 and 9. Once the jaws have fully closed, the continuation of the piston stroke and the pivoting of the levers 78 causes the two pairs of jaws 50, 52 and 54, 56 to pivot away from each other about the pivot axis Y into the separated position shown in FIG. 5. As is known in the art, the initial movement to close the jaws causes the gripper jaws 50, 52 to grip the wire being processed and the cutting jaws 54, 56 to cut part way through the insulation on the wire. Then, the pivotal movement of the pairs of jaws 50, 52 and 54, 56 away from each other causes the severed end of insulation to be stripped from the conductor. Preferably, the operator first applies only slight pressure on the trigger lever 36 to cause the jaws to close, and then verifies that the wire is lined up correctly in the blade slots 58 before pressing the lever 36 to supply full air pressure to strip the wire.

Once the insulation has been stripped, the trigger lever 36 is released to cut off the supply of pressurized air, and the spring 34 in the cylinder 28 returns the piston 30 to its rest position shown in FIG. 4. This in turn permits the levers 78 and jaws 50, 54 to return to their rest positions. A spring 84 is attached to each of the levers 78 by mounting studs 85 to bias the levers 78 into their separated position shown in FIG. 4. A torsion spring 65 (FIGS. 6–9) biases the two pieces of each mounting plate 62, 64 and the two pairs of jaws 50, 52 and 54, 56 together into the position shown in FIG. 4.

In order to ensure that each pair of jaws opens before the pairs of jaws move together, the stripper 22 is preferably provided with a latch for holding the pairs of jaws 50, 52 and 54, 56 apart until each of the upper jaws 50, 54 has returned to its upper open position. One embodiment of such a latch is shown in FIGS. 4–9. The latch includes a latch member 96 that is pivotally mounted on the rear mounting plate 64 by a mounting pin 98. The latch member 96 is biased into a downward position by a spring 100. Pivotal movement of the two pieces of each of the front and rear mounting plates 62, 64 away from each other brings a notch 104 in the latch member 96 into alignment with a latch post 102 that projects forwardly from the rear mounting plate 64. When these elements are aligned, the spring 100 causes the latch member 96 to drop down so that the notch 104 engages the post 102. This momentarily latches the pairs of jaws 50, 52 and 54, 56 into the spread apart position shown in FIG. 5 while each of the upper jaws 50, 54 moves into its open position Once the upper jaws 50, 54 have fully opened, the force of the springs 65, 84 overcomes the latch spring 100 and causes the halves of the mounting plates 62, 64 and the pairs of jaws to snap together into the closed position shown in FIG. 4.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. An improved wire stripper of a type having a pair of jaws movable toward and away from each other, and a pair of levers connected to at least one of said jaws and having end portions pivotable toward each other about a pivot axis to move said jaws together, wherein the improvement comprises:
   an actuator including an actuating member and being powered to translate said member along an actuating axis perpendicular to said pivot axis;
   an engagement surface carried by each of said end portions of said levers; and
   a flexible connector that engages an end portion of said actuating member adjacent to said end portions of said levers, and extends continuously from said member, to one of said levers, to the other of said levers, and then back to said member; said connector engaging said engagement surfaces to exert a pulling force thereon and convert linear movement of said member along said actuating axis into pivotal movement of said end portions of said levers about said pivot axis; said pulling force having a first component parallel to said actuating axis, and a second component perpendicular to said actuating axis and to said pivot axis.

2. The wire stripper of claim 1, in which said surfaces are formed by passageways extending through said end portions of said levers.

3. The wire stripper of claim 2, in which said actuator comprises a pneumatic piston and cylinder.

4. The wire stripper of claim 1, which comprises a sprocket wheel carried by each of said end portions of said levers; and in which said connector comprises a chain that engages said sprocket wheels and has opposite ends secured to said end portion of said member.

5. The wire stripper of claim 4, in which said actuator comprises a pneumatic piston and cylinder.

6. The wire stripper of claim 1, in which said actuator comprises a pneumatic piston and cylinder 7. The wire stripper of claim 6, in which said actuating member comprises said piston.

8. The wire stripper of claim 1, which comprises two pairs of jaws, and in which said pivotal movement first closes both said pairs of jaws and then moves said pairs of jaws away from each other.

9. The wire stripper of claim 8, in which said actuator comprises a pneumatic piston and cylinder.

10. An improved hand held wire stripper of a type having a main axis and including a pair of cutting jaws, a pair of gripping jaws laterally adjacent to the cutting jaws, and a pair of levers having inner end portions connected to one of said cutting jaws and one of said gripping jaws, respectively, and outer end portions pivotable toward each other about a pivot axis perpendicular to said main axis to first move said one cutting jaw and said one gripping jaw along said main axis to close said pairs of jaws and to then pivot said pairs of jaws away from each other about said pivot axis, wherein the improvement comprises:
   an actuator including an actuating member and being powered to translate said member along said main axis;
   an engagement surface carried by each of said outer end portions of said levers; and
   a flexible connector that engages an end portion of said actuating member adjacent to said outer end portions of said levers, and extends continuously from said member, to one of said levers, to the other of said levers, and then back to said member; said connector engaging said engagement surfaces to exert a pulling force thereon and convert linear movement of said member along said main axis into pivotal movement of said outer end portions of said levers about said pivot axis; said pulling force having a first component parallel to said main axis, and a second component perpendicular to said main axis and to said pivot axis.

11. The wire stripper of claim 10, in which said surfaces are formed by passageways extending through said outer end portions of said levers.

12. The wire stripper of claim 11, in which said actuator comprises a pneumatic piston and cylinder.

13. The wire stripper of claim 10, which comprises a sprocket wheel carried by each of said outer end portions of said levers; and in which said connector comprises a chain that engages said sprockets wheels and has opposite ends secured to said end portion of said member.

14. The wire stripper of claim 13, in which said actuator comprises a pneumatic piston and cylinder.

15. The wire stripper of claim 10, in which said actuator comprises a pneumatic piston and cylinder.

* * * * *

UNITED STATES PATENT AND TRADEMARK OFFICE
CERTIFICATE OF CORRECTION

PATENT NO. : 5,142,949
DATED : September 1, 1992
INVENTOR(S) : Franklin D. Harsch and Gary W. Gwin It is certified that error appears in the above-identified patent and that said Letters Patent is hereby corrected as shown below:

On the cover, under "References Cited, U.S. Patent Documents",
 "3,229,957" should be -- 3,222,957 --.
Column 1, line 37, there is a period after "stripping".
Column 3, lines 12 and 13, there is a period after "applicants".
Column 3, line 18, ".incorporated" should be -- incorporated --.
Column 3, line 23, there is a period after "stripper".
Column 3, line 46, "outting" should be -- cutting --.
Column 4, line 64, "outting" should be -- cutting --.
Column 5, line 27, "Preferably," begins a new paragraph.
Claim 6, column 7, line 38, there is a period after "cylinder".
Claim 10, column 8, line 3, "outting" should be -- cutting --.

Signed and Sealed this

Twenty-first Day of September, 1993

Attest:

BRUCE LEHMAN

*Attesting Officer*    *Commissioner of Patents and Trademarks*